United States Patent
El Defrawy et al.

(10) Patent No.: US 10,129,342 B2
(45) Date of Patent: Nov. 13, 2018

(54) MAPPING NETWORK SERVICE DEPENDENCIES

(71) Applicant: The Boeing Company, Chicago, IL (US)

(72) Inventors: Karim El Defrawy, Santa Monica, CA (US); Hyun Jin Kim, Calabasas, CA (US); Pape Maguette Sylla, Calabasas, CA (US); Ryan F. Compton, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 199 days.

(21) Appl. No.: 14/745,262

(22) Filed: Jun. 19, 2015

(65) Prior Publication Data
US 2016/0373535 A1  Dec. 22, 2016

(51) Int. Cl.
G06F 15/173 (2006.01)
H04L 29/08 (2006.01)
H04L 12/24 (2006.01)

(52) U.S. Cl.
CPC .............. *H04L 67/16* (2013.01); *H04L 41/22* (2013.01); *H04L 41/12* (2013.01); *H04L 41/5058* (2013.01)

(58) Field of Classification Search
CPC .......... H04L 67/16; H04L 41/22; H04L 41/12
See application file for complete search history.

(56) References Cited

U.S. PATENT DOCUMENTS

| | | | |
|---|---|---|---|
| 2006/0039293 A1* | 2/2006 | Uthe | H04L 12/2602 370/252 |
| 2008/0222287 A1* | 9/2008 | Bahl | H04L 41/12 709/224 |
| 2013/0116986 A1* | 5/2013 | Zhang | G06F 17/5009 703/2 |
| 2014/0164607 A1* | 6/2014 | Bai | H04L 41/14 709/224 |
| 2014/0201642 A1* | 7/2014 | Vicat-Blanc | H04L 41/22 715/736 |
| 2015/0261887 A1* | 9/2015 | Joukov | G06F 17/30958 707/603 |

OTHER PUBLICATIONS

U.S. Appl. No. 14/523,473, filed Oct. 24, 2014.
Ni et al.; "Information Dynamic Spectrum Characterizes System Instability Toward Critical Transitions"; EPJ Data Science; vol. 3 No. 28; 2014; 25 pages.
"Euclidean distance"; https://en.wikipedia.org/wiki/Euclidean_distance; Wikipedia; accessed Jul. 7, 2015; 4 pages.
"Distance"; http://mathworld.wolfram.com/Distance.html; Wolfram Math World; 1999-2015; accessed Jul. 7, 2015, 2 pages.

* cited by examiner

*Primary Examiner* — Nam T Tran
(74) *Attorney, Agent, or Firm* — Gates & Cooper LLP

(57) ABSTRACT

Example methods and systems for mapping network service and/or application dependencies are provided. Some examples may visualize a large, complex network of network services and/or applications (e.g., Internet services and applications) and their dependencies over time. Each service (or application) may be represented as a node and the visualization may present information regarding the relationships among services and/or applications using directed edges (or lines) with varying thickness, colors, and/or line-styles depending on network data.

17 Claims, 8 Drawing Sheets
(2 of 8 Drawing Sheet(s) Filed in Color)

MAPPING NETWORK SERVICE DEPENDENCIES

BACKGROUND INFORMATION

1. Field

The present disclosure relates generally to networks and, in particular, to nodes in a data network. Still more particularly, the present disclosure relates to a method and apparatus for mapping dependencies between network services and/or applications associated with a data network.

2. Background

A data network is a communications network that allows devices to exchange data. An Internet Protocol (IP) network is a data network that uses the Internet Protocol suite to send and receive data. The Internet Protocol suite is the computer networking model and set of communications protocols used on the Internet and similar computer networks. The different types of communications protocols in the Internet Protocol suite that may be used include the Internet Protocol (IP), the Transfer Control Protocol (TCP), the User Datagram Protocol (UDP), and other types of protocols. An Internet Protocol network may be implemented using any number of Internet networks, local area networks (LAN), enterprise networks, or other types of networks.

Oftentimes, Internet Protocol networks are based on a client-service model. With a client-service model, a client generates and sends a request to a service and the service handles the request and sends a response back to the client. The clients and services that communicate over an Internet Protocol network may be referred to as nodes. Some Internet Protocol networks may include only nodes that use the Transfer Control Protocol.

Data networks and, in particular, Internet Protocol networks are becoming larger and more complex. Consequently, there is a pressing need for tools to aid network administrators and designers in managing and operating these types of networks. For example, a tool capable of mapping dependencies between services and/or applications in such networks may be desirable. A dependency between a first service (or application) and a second service (or application) may occur, for example, when the first service (or application) is reliant upon the second service (or application) to fulfill a request received by the first service (or application).

Some conventional tools are capable of identifying service (or application) dependencies. However, these currently available tools may be unable to visually represent a chain of dependencies across multiple services (or applications). Conventional visualization tools are primitive, including open-source graphical user interfaces (e.g., Gephi, NetworkX, Graphviz, graph-tool, NodeXL), and these conventional tools support drawing edges between two nodes, effectively visualizing relationships between only two hosts. However, conventional tools do not capture any dependence among multiple nodes or temporal aspects. Consequently, network administrators using conventional tools can only observe an instantaneous snapshot of network conditions between pairs of nodes, which is insufficient to properly diagnose network disruptions or to schedule maintenance without disturbing normal operations, as most of such disruptions are complex and involve dependencies across more than two nodes.

Therefore, it would be desirable to have a method and apparatus that take into account at least some of the issues discussed above, as well as other possible issues.

SUMMARY

A first aspect of the present disclosure provides methods for generating a visualization of a plurality of service dependencies. Example methods may include generating, by a network management device, a node indication representative of a plurality of nodes in communication with a data network. The methods may also include generating, by the network management device, a first service path indication representative of a first service path between at least two nodes of the plurality of nodes, the first service path corresponding to a first interaction among the at least two nodes. The methods may also include outputting, by the network management device, a visual representation including at least the node indication and the first service path indication.

A second aspect of the present disclosure provides network data visualization systems. Example systems may include a graph processing module that includes a data processing unit and a graph layout unit. The graph processing module may receive network data associated with a plurality of nodes in a data network. The data processing unit may assign a first color to a first interaction between at least two nodes of the plurality of nodes and may assign a second color to a second interaction between at least two nodes of the plurality of nodes. The graph layout unit may generate a first line representative of the first interaction and generates a second line representative of the second interaction. The first line may be first color and the second line may be the second color.

A third aspect of the present disclosure provides methods of mapping a data network. Example methods may include receiving, by a network management device, network data associated with activity on a data network over a time period, where the activity may include a plurality of interactions among a plurality of nodes in the data network. The methods may also include analyzing, by the network management device, the network data to assign a color to each interaction of the plurality of interactions. The methods may also include identifying, by the network management device, a layout for a visual representation of the data network, where the layout defines at least a placement of the plurality of nodes and the plurality of interactions. The methods may also include generating, by the network management device, the visual representation such that each of the plurality of interactions is depicted as their respective assigned color.

The features and functions can be achieved independently in various embodiments of the present disclosure or may be combined in yet other embodiments in which further details can be seen with reference to the following description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The present disclosure generally describes example methods, systems, and apparatuses for visualizing network service and/or application dependencies over time involving multiple variables (e.g., nodes, edges, time delay) in two dimensions, and may be extended to multi-dimensions with an increased number of variables.

Visualizing network service (or application) dependencies over multiple hops of network hosts over time may aid a network administrator in analyzing a computer network. Such an approach may be part of an Intrusion Detection System (IDS), or used when trouble shooting and monitoring the normal operation of a computer network. In some examples, the methods, systems, and apparatuses disclosed herein may aid a network administrator to identify critical servers and manage their networks more effectively, for example, by properly diagnosing network disruptions or efficiently scheduling network maintenance without disturbing normal operations.

Figure 1:
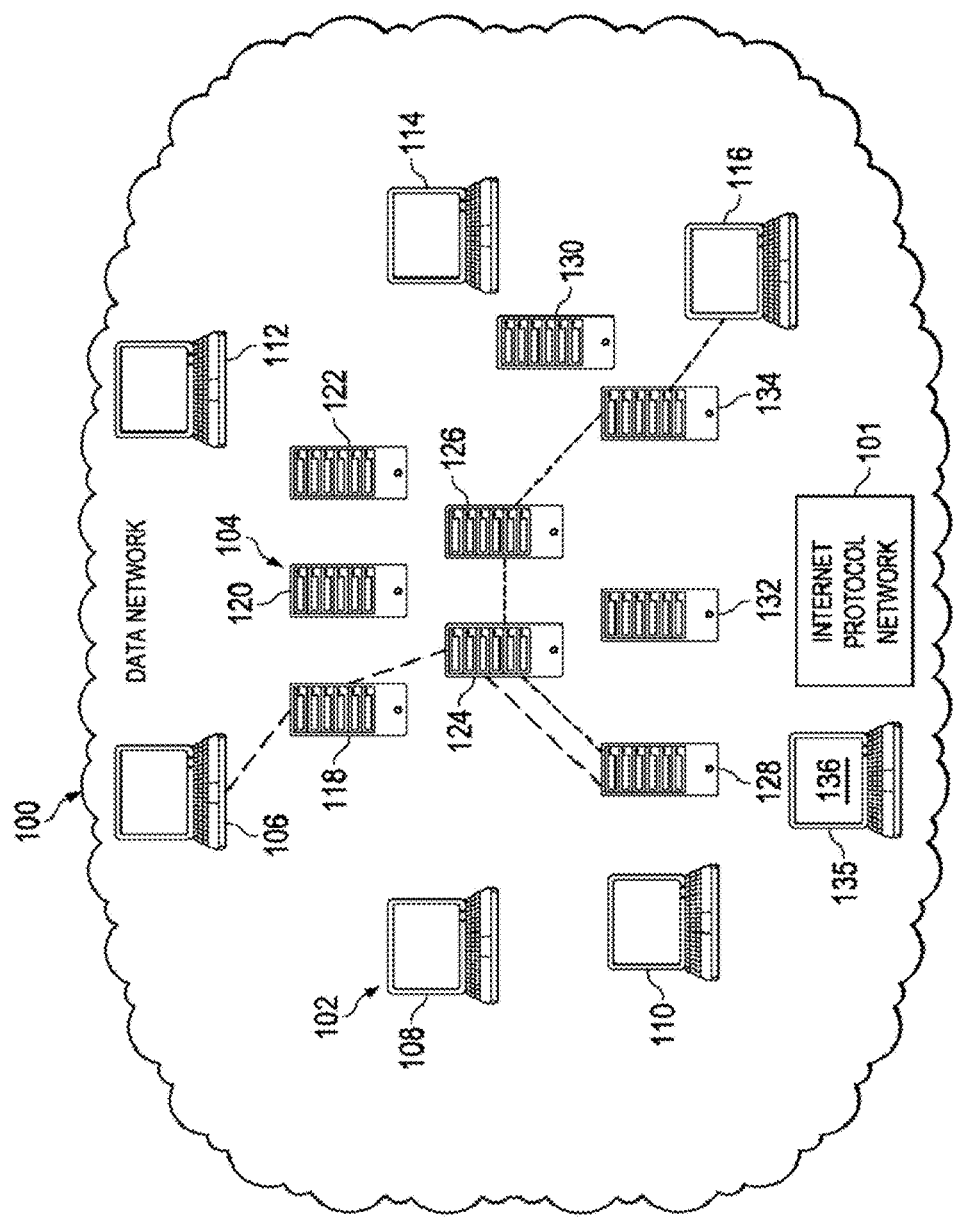
FIG. 1 is an illustration of a data network in accordance with an illustrative embodiment.

FIG. 1 is an illustration of a data network in accordance with an illustrative embodiment. In this illustrative example, data network 100 may take the form of Internet Protocol (IP) network 101 that uses the Transfer Control Protocol/Internet Protocol (TCP/IP) suite. However, in other illustrative examples, data network 100 may take the form of some other type of data network.

Data network 100 may be comprised of any number of Internet networks, local area networks (LAN), enterprise networks, other types of networks, or combination thereof. As one illustrative example, data network 100 may be comprised of a single local area network (LAN). In other illustrative examples, data network 100 may be comprised of an Internet network and two local area networks.

A plurality of client devices 102 and a plurality of service devices 104 may be associated with data network 100. As used herein, being "associated with" a network, such as data network 100, means being part of, connected to, or able to communicate with data network 100 in some other manner. In this illustrative example, a client device, such as each of plurality of client devices 102 may be any device on which a client is implemented. A service device, such as each of plurality of service devices 104 may be any device on which a service is implemented. A plurality of client devices 102 may include client devices 106, 108, 110, 112, 114, and 116, and a plurality of service devices 104 may include service devices 118, 120, 122, 124, 126, 128, 130, 132, and 134. In this example, a client may be implemented on each of plurality of client devices 102, 106, 108, 110, 112, 114, and 116 and a service may be implemented on each of plurality of service devices 104, 118, 120, 122, 124, 126, 128, 130, 132, and 134.

Network manager (or network management device) 135 may be used to manage data network 100. In this illustrative example, network manager 135 may be used to detect the services (or applications) implemented on plurality of service devices 104 and discover dependencies between these services (or applications). As depicted, network manager 135 may be implemented on computer system 136.

Figure 2:
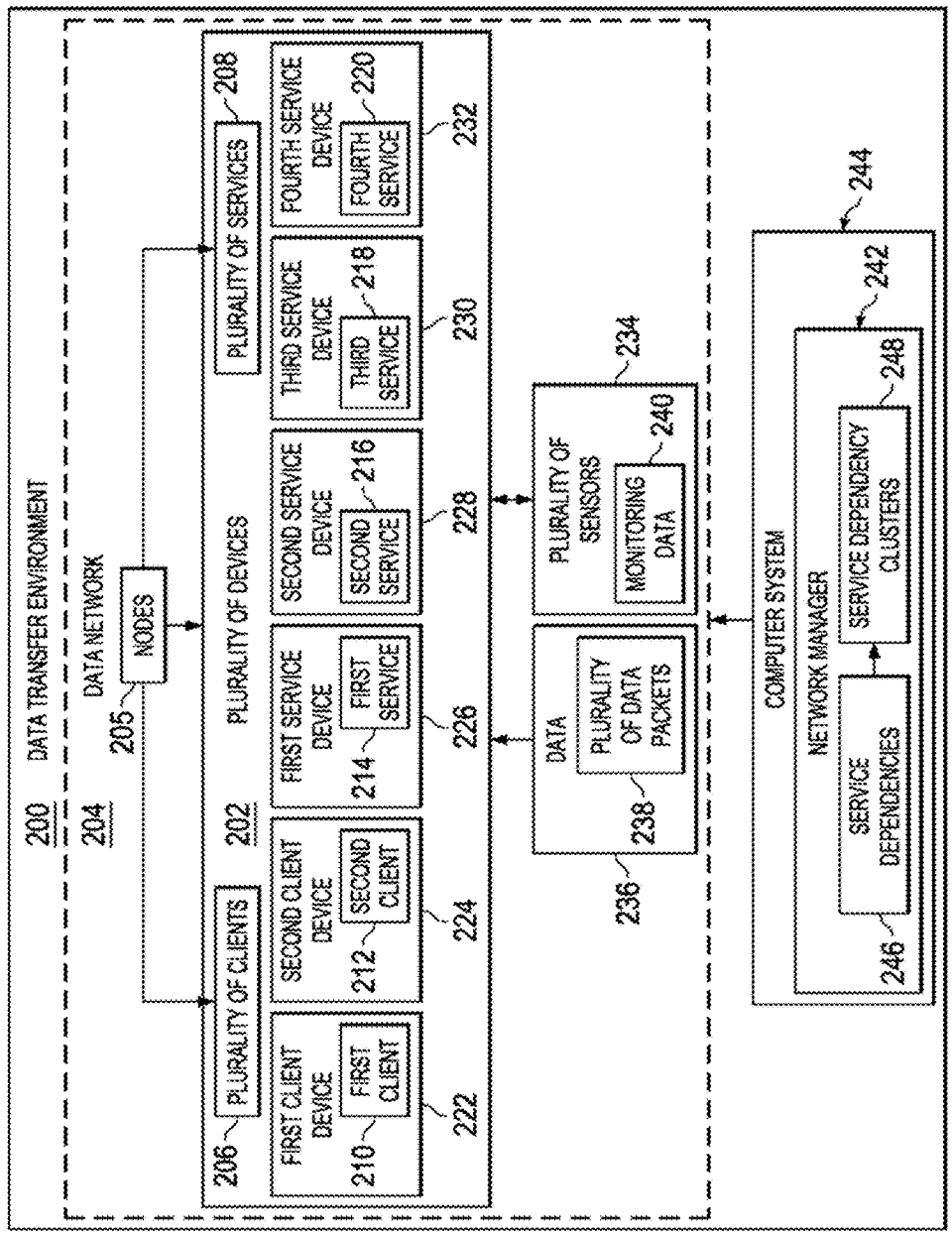
FIG. 2 is an illustration of a data transfer environment in the form of a block diagram in accordance with an illustrative embodiment.

With reference now to FIG. 2, an illustration of a data transfer environment is depicted in the form of a block diagram in accordance with an illustrative embodiment. In this illustrative example, data transfer environment 200 may include plurality of devices 202 associated with data network 204. Data network 204 may be comprised of any number of Internet networks, local area networks (LAN), enterprise networks, other types of data networks, or combination thereof. In other illustrative examples, data network 204 may be simply referred to as a network.

Data network 204 may take the form of an Internet Protocol network. The Internet Protocol network may use at least one of the Transfer Control Protocol, the User Datagram Protocol, or some other type of protocol.

Each of plurality of devices 202 may be considered associated with data network 204 by being part of, connected to, or able to communicate with data network 204 in some other manner. Each of plurality of devices 202 may take the form of a computer, a laptop computer, a tablet, a server computer, a smartphone, a processor unit, a switch, a router, or some other type of device capable of sending and receiving data.

Nodes 205 may be implemented on plurality of devices 202. Nodes 205 may include plurality of clients 206 and plurality of services 208. Depending on the implementation, each of plurality of clients 206 and each of plurality of services 208 may be implemented on a different one of plurality of devices 202. In some illustrative examples, more than one of plurality of clients 206 may be implemented on a particular device or more than one of plurality of services 208 may be implemented on a particular device. In other illustrative examples, one or more clients and one or more services may be implemented on the same device. In this manner, at least one of a client in plurality of clients 206 or a service in plurality of services 208 may be implemented on each of plurality of devices 202.

In one illustrative example, plurality of clients 206 includes first client 210 and second client 212 and plurality of services 208 includes first service 214, second service 216, third service 218, and fourth service 220. First client 210, second client 212, first service 214, second service 216, third service 218, and fourth service 220 may be implemented on first client device 222, second client device 224, first service device 226, second service device 228, third service device 230, and fourth service device 232, respectively, of plurality of devices 202.

As depicted, a plurality of sensors 234 may be associated with data network 204. The plurality of sensors 234 may be implemented using hardware, software, firmware, or a combination thereof. Each of the sensors 234 may be used to monitor the flow of data between the various clients and services associated with plurality of devices 202. In one illustrative example, the plurality of sensors 234 may be implemented using NETFLOW sensors, which may be obtained from Cisco Systems, Incorporated.

Depending on the implementation, each of the sensors 234 may be implemented on a corresponding one of plurality of devices 202. In some cases, more than one of the sensors 234 may be implemented on a same device in plurality of devices 202.

The plurality of sensors 234 monitor the flow of data 236 over data network 204 to generate monitoring data 240. In some cases, this monitoring may be referred to as the plurality of sensors 234 "listening" to data network 204 to generate monitoring data 240 about data 236 being exchanged over data network 204.

In one illustrative example, data 236 may be exchanged over data network 204 in the form of plurality of data packets 238. Each of plurality of data packets 238 may include at least one of header data or metadata that may be used by the plurality of sensors 234 to track the data packet. As one illustrative example, the header data of a particular data packet in plurality of data packets 238 may include a source Internet Protocol address, a destination Internet Protocol address, a source port, a destination port, and a type of protocol. The type of protocol may be, for example, without limitation, the Transfer Control Protocol, the User Datagram Protocol, or some other type of protocol. In some cases, monitoring data 240 may include at least a portion of this header data or metadata.

The plurality of sensors 234 may send monitoring data 240 to network manager (or network management device) 242. Monitoring data 240 may be sent to network manager 242 as monitoring data 240 is received. Depending on the implementation, monitoring data 240 may be sent to network manager 242 continuously or periodically in response to the occurrence of some event. The event may be, for example, the receiving of a command, the generation of a certain amount of monitoring data, the lapse of a timer, or some other type of event.

In this illustrative example, network manager 242 may be implemented in software, hardware, firmware, or a combination thereof. When software is used, the operations performed by network manager 242 may be implemented using, for example, without limitation, program code configured to run on a processor unit. When firmware is used, the operations performed by network manager 242 may be implemented using, for example, without limitation, program code and data and stored in persistent memory to run on a processor unit.

When hardware is employed, the hardware may include one or more circuits that operate to perform the operations performed by network manager 242. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations and processes performed by network manager 242 may be performed using organic components integrated with inorganic components. In some cases, the operations and processes may be performed by entirely organic components, excluding a human being. As one illustrative example, circuits in organic semiconductors may be used to perform these operations and processes.

In this illustrative example, network manager 242 may be implemented using computer system 244. Computer system 244 may be comprised of one or more computers in communication with each other. In other illustrative examples, network manager 242 may be implemented on one of plurality of devices 202.

Network manager 242 may use monitoring data 240 to discover service dependencies 246. Further, network manager 242 may use monitoring data 240 to identify service dependency clusters 248 based on service dependencies 246.

In some examples, network manager 242 may generate and/or output data related to the data network 204 and data network 204 activity. In some examples, the data may include the types of data disclosed in co-pending patent application Ser. No. 14/523,473, filed on Oct. 24, 2014, and titled "Mapping Network Service Dependencies, the disclosure of which is hereby incorporated by reference in its entirety.

For example, network manager 242 may generate and/or output data about network service identities (e.g., IP addresses, media access control address (MAC) addresses, or port numbers), the instances of interactions $L_{ij}$ from service i to service j over some given time period, and additional information for the network administrator $\alpha_n$, such as the duration of each interaction, metrics capturing causality or information exchange such as transfer entropy, service dependencies, service dependency clusters, and other data.

Figure 3:
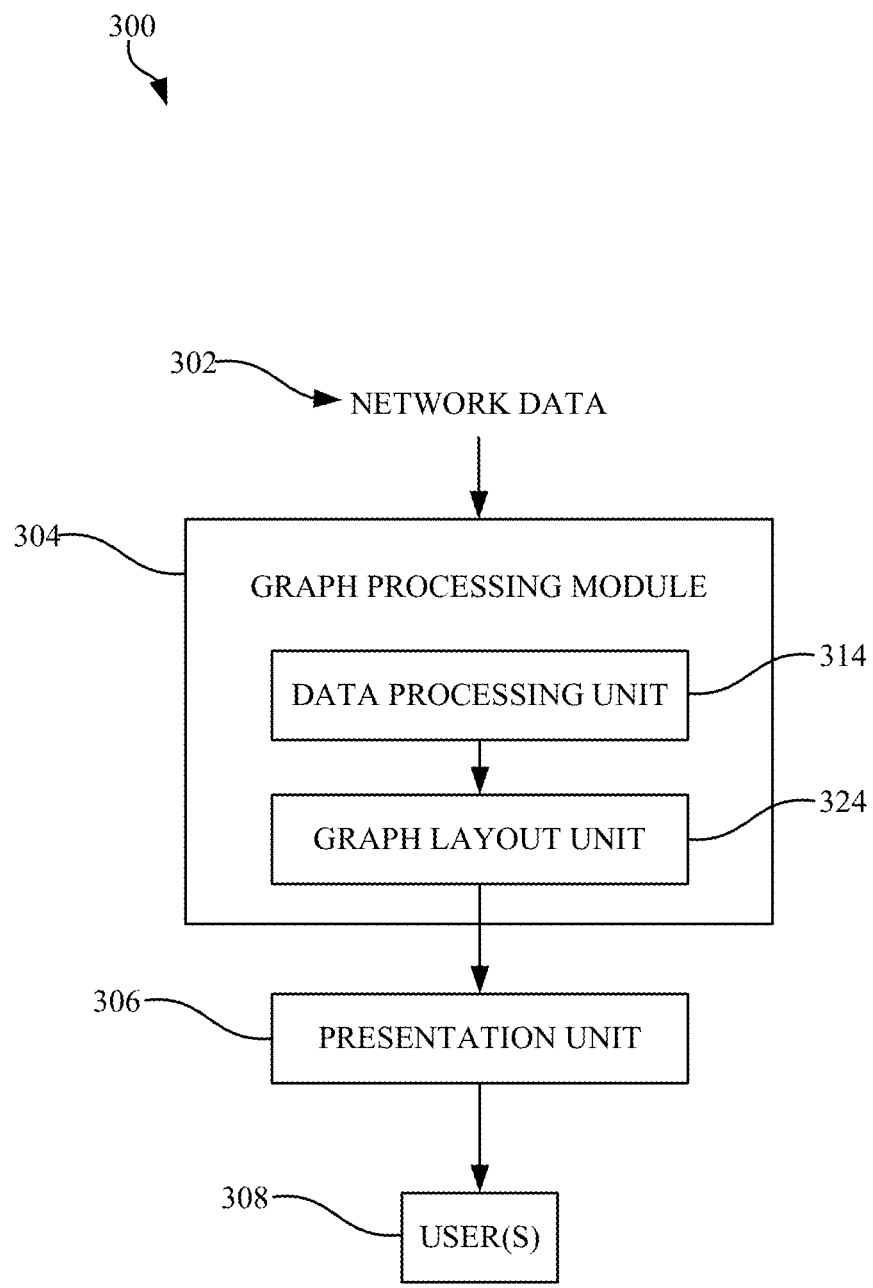
FIG. 3 is an illustration of an example data visualization system in the form of a block diagram in accordance with an illustrative embodiment.

FIG. 3 is an illustration of an example data visualization system 300 in the form of a block diagram in accordance with an illustrative embodiment. Data visualization system 300 may receive network data 302 and may generate and/or output visual depiction(s) (or other human-interpretable representations) of network data 302 via a graph processing module 304 and/or a presentation unit 306. In some examples, graph processing module 304 may include a data processing unit 314 and/or a graph layout unit 324. A user or users 308 may view the mapped network data 302. In some examples, data visualization system 300 may be implemented by network manager 135, 242 and/or computer system 136, 244.

FIG. 3 represents a system implementing a graph-processing methodology that may visualize a large, complex network of network services (e.g., Internet services) and their dependencies over time. Each service may be represented as a node and the visualization may present information regarding the relationships among services using directed edges (or lines) with varying thickness, colors, and/or line-styles depending on density of graph/data.

Data processing unit 314 of data visualization system 300 may process network data 302. As previously described, the network data 302 may include network service identities (e.g., IP addresses, MAC addresses, or port numbers), the instances of interactions Iij from service i to service j over some given time period, and additional important information for the network administrator $\alpha_n$, such as the duration of each interaction, metrics capturing causality or information exchange such as transfer entropy, among others. This data may be sorted in the lexicographical order of the initiating service identities and the time of the interaction instance, in some examples.

Data processing unit 314 may analyze the network data 302 to prepare the network data 302 for the graph layout unit 324. More specifically, for any given two network services or nodes IPi and IPj with interaction instance or edge Iij at time tij, the data processing unit 314 may assign color Cij to Iij (if no color has been assigned yet; otherwise use the assigned color) and may search if there is another interaction instance(s) Ijk from service IPj to another service IPk at time tjk, where tij≤tjk. Depending on a time difference (Δ) between tij and tjk (i.e., Δik=|tjk−tij|), the data processing unit 314 may assign a new color Cjk, the Euclidean distance of which from Cij may be proportional to Δ: $\|Cjk-Cij\| \propto \Delta ik$. In some examples, the more recently two interaction instances Iij and Ijk have occurred, the more similar colors two interaction instances may be assigned. Data processing and color assignment processing may repeat for all interactions identified in the network data 302.

In some examples, the data processing unit 314 may attempt to avoid a situation in which similar colors are accidentally assigned to a service path without relevant dependencies.

One example method of assigning colors to service paths may be based, at least in part, on visualizing dependencies of a node of interest. For example, if a network administrator knows the IP address of the network service that he is interested in observing, a minimum spanning tree-based coloring algorithm may be implemented as follows:

1. Let $IP_i$ be the node that the network administrator is interested in observing.
2. Find a minimum spanning tree starting from IPi given edge weights $\Delta_i^*$.
3. Select color $C_i^*$ for the edges $I_i^*$ that connect the parent node $IP_i$ to its child node(s) IP*.
4. Assign color C to edges in the minimum spanning tree such that $\|C^{}-C_i^*\| \propto \Delta_i^*$.
5. Repeat Step 4 for all the edges in the minimum spanning tree until the child node is the leaf node.

Another example method of assigning colors to service paths may be based, at least in part, on visualizing dependencies in general. For example, if the network administrator does not have a particular node that he is interested in visualizing, a more generalized coloring algorithm may be implemented for the given network data G={N, E}, where N represents the set of nodes and E represents the set of edges that need to be visualized. An example of a more generalized coloring algorithm may be implemented as follows:

1. Let the initial colored node set S be empty (i.e., S={ }).
2. Let $IP_i$ be a node that is randomly selected from N\S, and let S=∪{$IP_i$}.
3. Assign distinct color $C_{ij}$ to every existing edge $I_{ij}$ from $IP_i$ to all unique $IP_j$'s and add all $IP_j$'s to S (i.e., S=S∪$IP_j$'s).
4. For each $IP_j \in S$, for all existing edge $I_{jk}$ to $IP_k$'s, S=S∪$IP_k$'s, and:
   a. If no color has been assigned to $IP_k$'s adjacent edges $I_{kl}$, assign color $C_{jk}$ to $I_{jk}$, where $\|C_{jk}-C_{ij}\| \propto \Delta_{ik}$.
   b. If color $C_{kl}$ has been assigned to $IP_k$'s adjacent edges $I_{kl}$, assign color $C_{jk}$ to $I_{jk}$, where $\|C_{jk}-C_{ij}\| \propto \Delta_{ik}$ AND $\|C_{kl}-C_{jk}\| \propto \Delta_{jl}$.
5. Iterate Step 4 until all adjacent edges to nodes in S are colored.
6. If there are nodes that has edges without assigned colors (i.e., N≠S), then iterate Steps 2-5 until N=S.

Graph layout unit 324 of data visualization system 300 may identify and/or determine a graph layout for the visualization mapping. With assigned colors for all the interaction instances among network services, the graph layout unit 324 may represent each service identity as a node and the interaction instance as a directed edge in the graph. Furthermore, depending on the additional, possibly multiple information $\alpha_n$ that was provided in the network data 302, such as the duration of each interaction, causality, or information transfer parameter (e.g., a value of the transfer entropy) flows for each interaction, and the like, the graph layout unit 324 may adjust the weight on each edge based on the normalized aggregation of $\alpha_n$ values.

Presentation unit 306 of data visualization system 300 may output the resulting directed graph such that network administrator users 308 may effectively and efficiently observe, identify, and infer multiple, relayed network service dependencies beyond one hop over a time range. Example outputs may include static and/or interactive output formats. In some examples, outputs may include reports and/or animated outputs.

Figure 4:
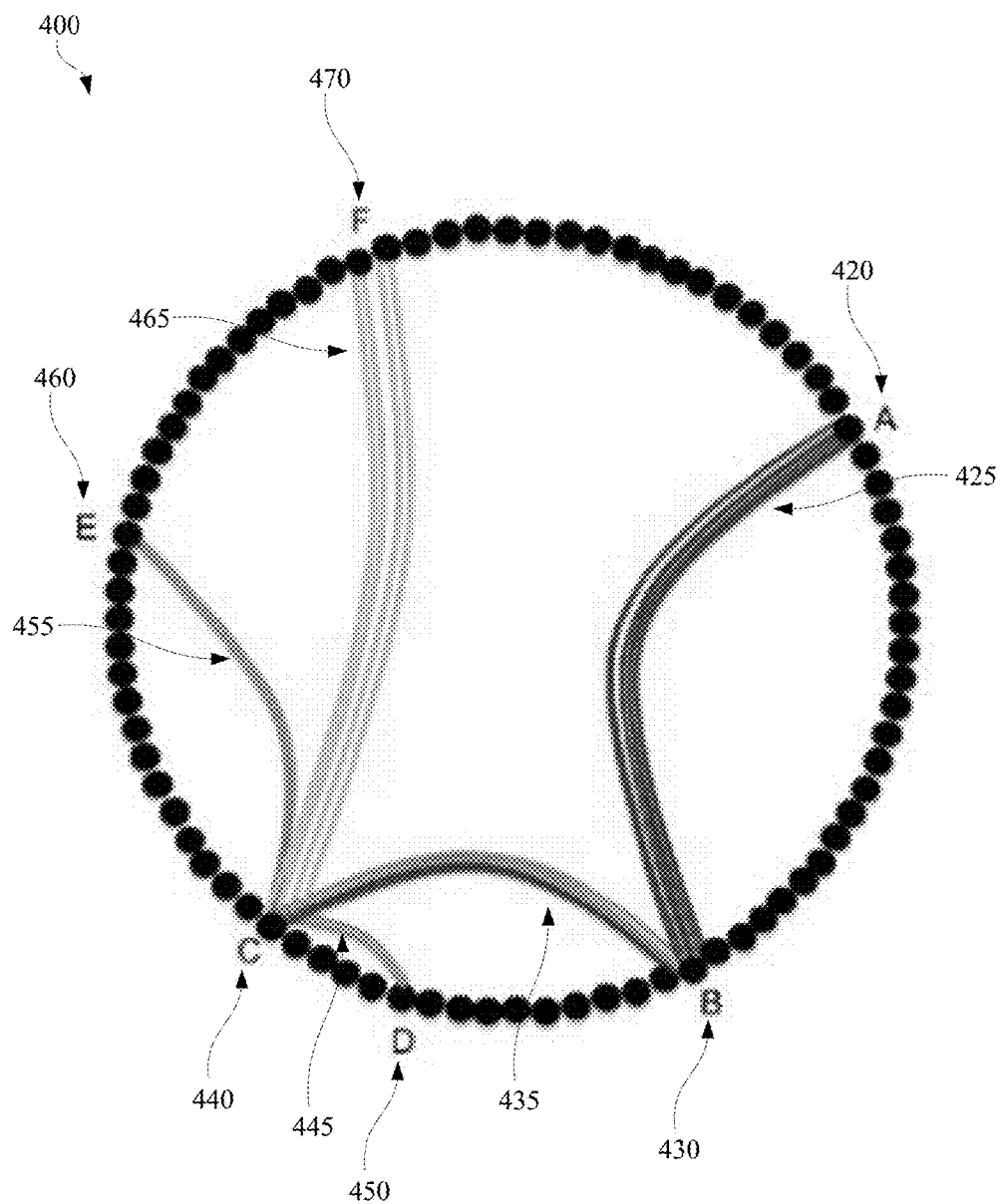
FIGS. 4-5 illustrate two example visualizations of mapping complex network dependencies using the graph processing module of FIG. 3 in accordance with an illustrative embodiment.
Figure 5:
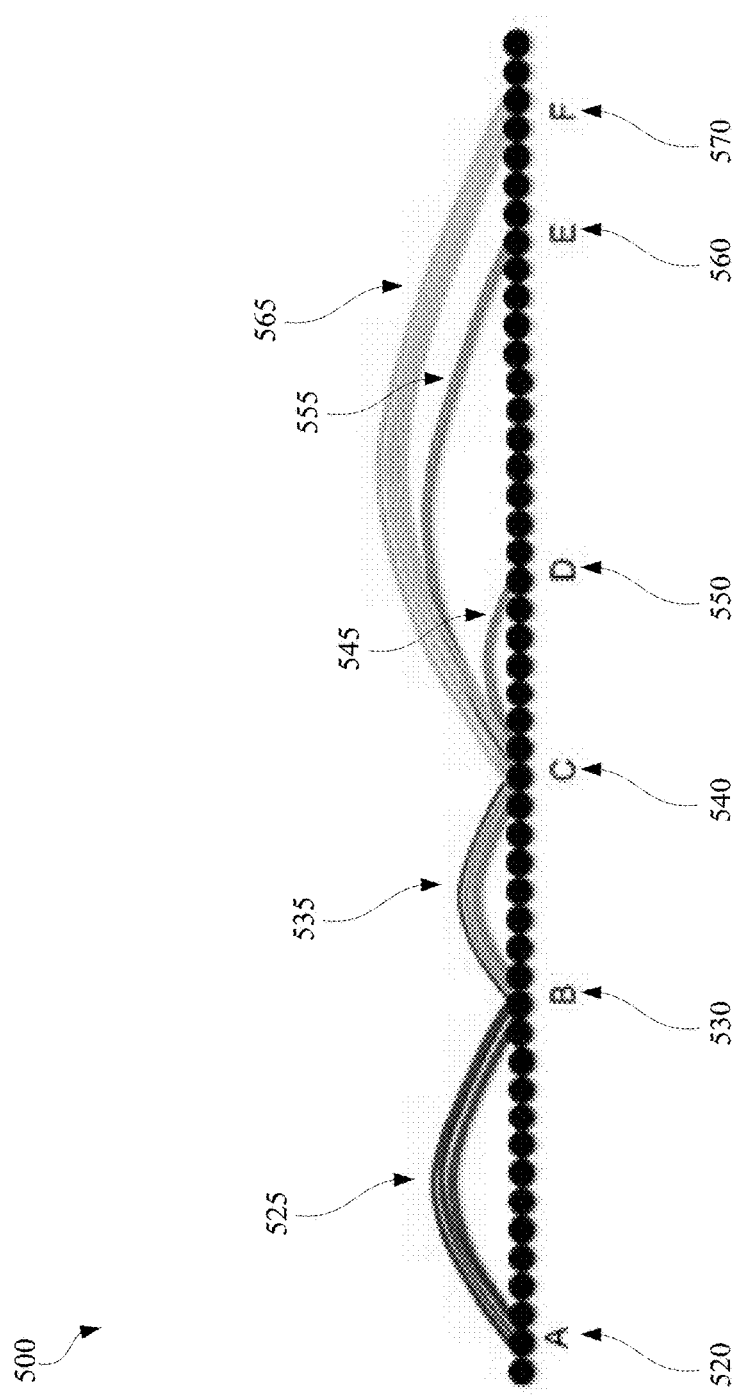

FIGS. 4-5 illustrate two example visualizations 400, 500 of mapping complex network dependencies using the proposed graph processing module of FIG. 3. Visualization 400 includes node indications 420, 430, 440, 450, 460, 470 and service path indications (e.g., lines, edges) between and among certain of node indications 420, 430, 440, 450, 460, 470. Likewise, visualization 500 includes node indications 520, 530, 540, 550, 560, 570 and service path indications (e.g., lines, edges) between and among certain of node indications 520, 530, 540, 550, 560, 570. Node indications 420, 430, 440, 450, 460, 470, 520, 530, 540, 550, 560, 570 may be any visual indication that represents a node in a data network, including a shape (e.g., circle), an icon, an image, and/or text, among other indications.

As depicted in FIGS. 4-5, similar colors may be assigned to edges (or lines) 425, 435, 445, 455, 465 that indicate potential service dependencies with high probability. More specifically, a service path 425, 435, 445 from nodes A 420 to node B 430 to node C 440 to node D 450 (i.e., A→B→C→D) is likely to represent dependencies. Service path A→B→C→D is represented as having shades of the same color, thus representing dependencies among node A 420, node B 430, node C 440, and node D 450.

Service path 435, 455 from nodes B 430 to node C 440 to node E 460 (i.e., B→C→E) and service path 435, 465 from nodes B 430 to node C 440 to node F 470 (i.e., B→C→F) are unlikely to represent dependencies. Although the service paths 435 between node B 430 and node C 440 represent a first color, neither service path 455 between node C 440 to node E 460 nor service path 465 node C 440 to node F 470 are shades of the same color.

FIG. 5 depicts a similar, but distinct example visualization 500 to that shown in FIG. 4. FIG. 5 depicts relationships and dependencies among node A 520, node B 530, node C 540, node D 550, node E 560, and node F 570. Similar to FIG. 4, the service paths 525, 535, 545, 555, 565 having shades of the same color represent dependencies, while the service paths 525, 535, 545, 555, 565 having different colors are unlikely to represent dependencies.

Service path 535, 555 from nodes B 530 to node C 540 to node E 560 (i.e., B→C→E) and service path 535, 565 from nodes B 530 to node C 540 to node F 570 (i.e., B→C→F) are unlikely to represent dependencies. Although the service paths 535 between node B 530 and node C 540 represent a first color, neither service path 555 between node C 540 to node E 560 nor service path 565 between node C 540 to node F 570 are shades of the same color.

While FIGS. 4-5 depict two-dimensional visualizations of mapping complex network dependencies, the present disclosure contemplates that multiple-dimensional visualizations may also be generated by examples of the present disclosure. For example, three-dimensional visualizations may include a third dimension.

Figure 6:
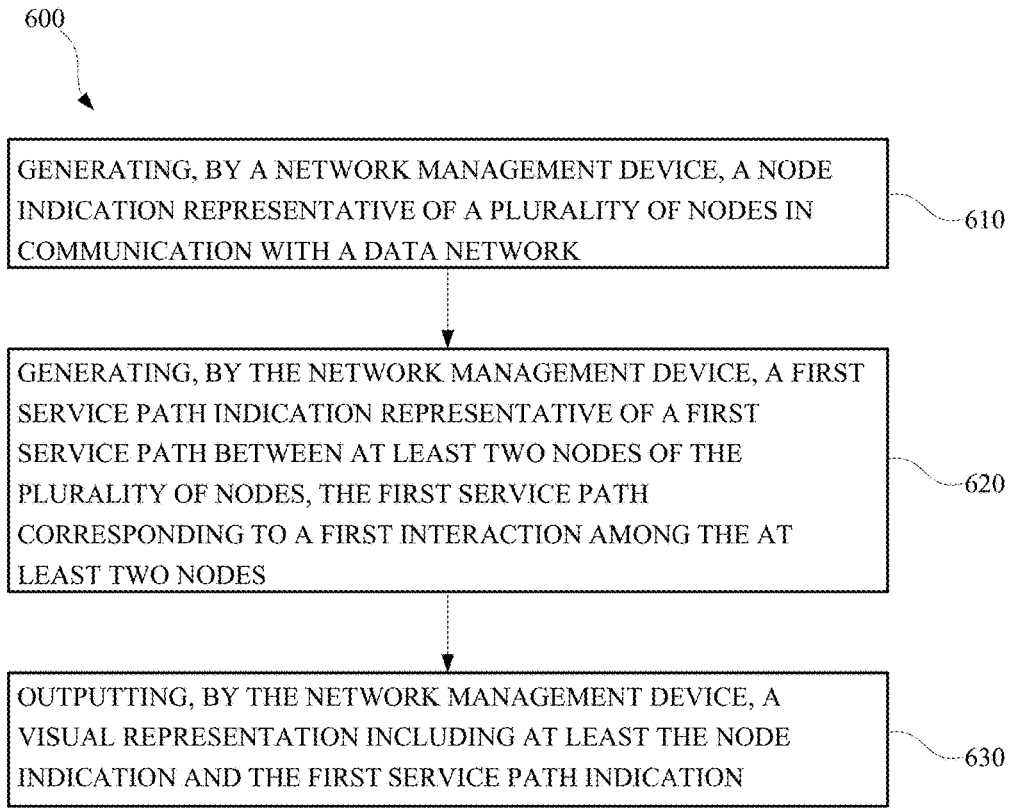
FIGS. 6-7 illustrate two example visualization methods in accordance with an illustrative embodiment.
Figure 7:
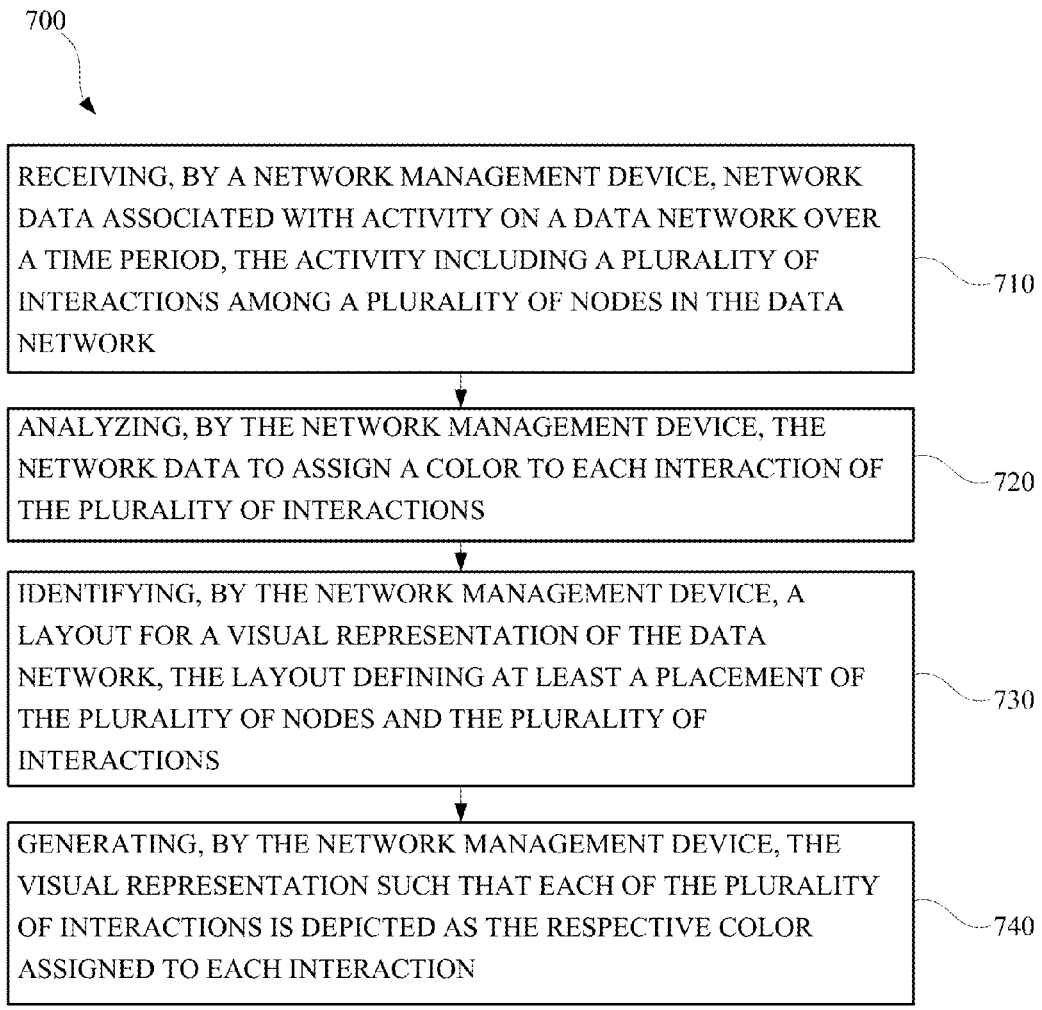

FIGS. 6-7 illustrate two example visualization methods in accordance with an illustrative embodiment.

FIG. 6 depicts a method 600 for generating a visualization of a plurality of service dependencies. Example method 600 may include generating 610, by a network management device, a node indication representative of a plurality of nodes in communication with a data network. The method 600 may also include generating 620, by the network management device, a first service path indication representative of a first service path between at least two nodes of the plurality of nodes, the first service path corresponding to a first interaction among the at least two nodes. The example method 600 may further include outputting 630, by the network management device, a visual representation including at least the node indication and the first service path indication.

FIG. 7 depicts a method 700 of mapping a data network. The method 700 may include receiving 710, by a network management device, network data associated with activity on a data network over a time period. The activity may include a plurality of interactions among a plurality of nodes in the data network. The method 700 may also include analyzing 720, by the network management device, the network data to assign a color to each interaction of the plurality of interactions. The method 700 may further include identifying 730, by the network management device, a layout for a visual representation of the data network, where the layout defines at least a placement of the plurality of nodes and the plurality of interactions. The method 700 may then generate 740, by the network management device, the visual representation such that each of the plurality of interactions is depicted as their respective assigned color.

Figure 8:
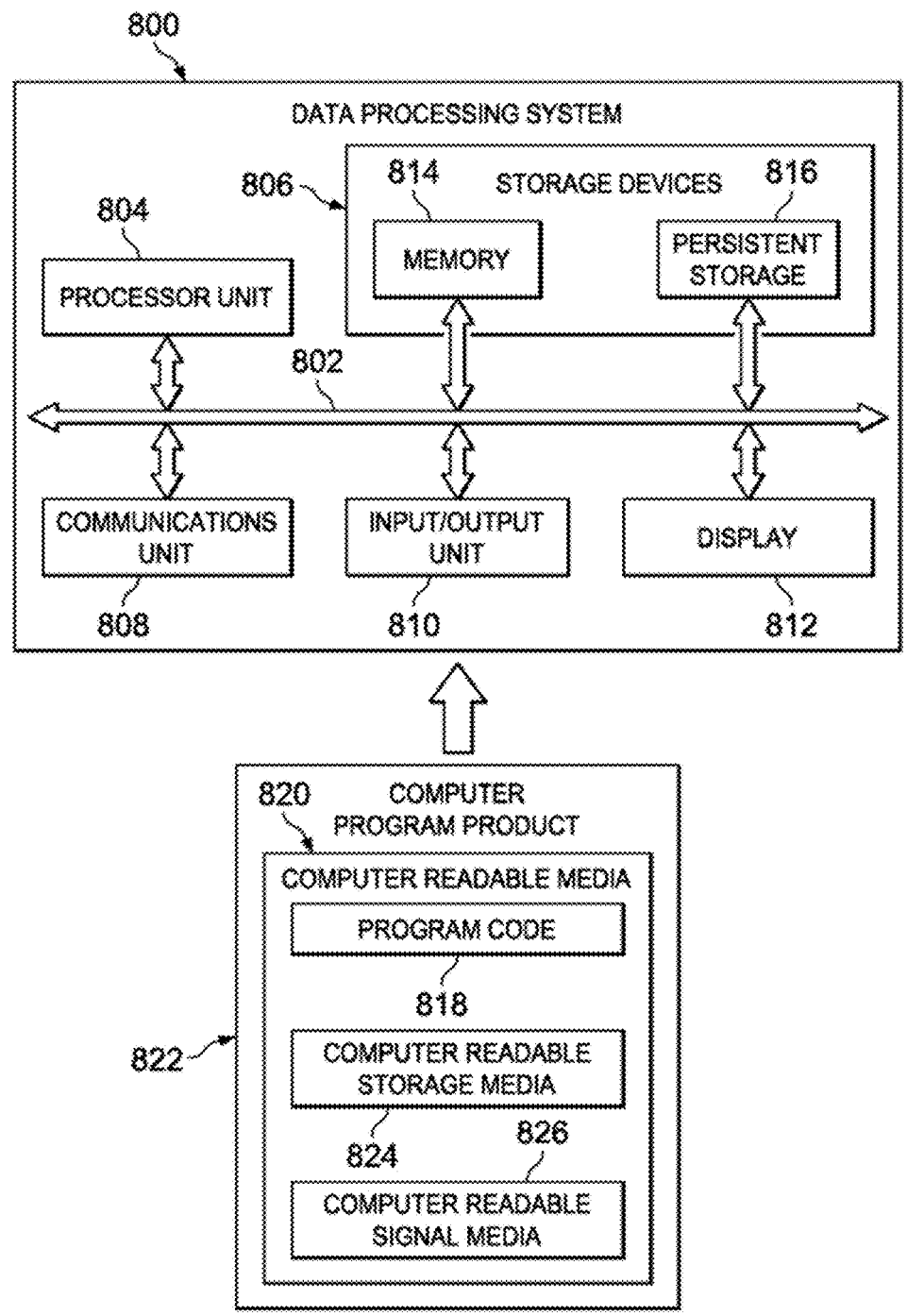
FIG. 8 is an illustration of a data processing system in the form of a block diagram in accordance with an illustrative embodiment.

Turning now to FIG. 8, an illustration of a data processing system is depicted in the form of a block diagram in accordance with an illustrative embodiment. Data processing system 800 may be used to implement computer system 244 in FIG. 2 and/or the data visualization system 300 in FIG. 3. As depicted, data processing system 800 includes communications framework 802, which provides communications between processor unit 804, storage devices 806, communications unit 808, input/output unit 810, and display 812. In some cases, communications framework 802 may be implemented as a bus system.

Processor unit 804 is configured to execute instructions for software to perform a number of operations. Processor unit 804 may comprise at least one of a number of processors, a multi-processor core, or some other type of processor, depending on the implementation. In some cases, processor unit 804 may take the form of a hardware unit, such as a circuit system, an application specific integrated circuit (ASIC), a programmable logic device, or some other suitable type of hardware unit.

Instructions for the operating system, applications and programs run by processor unit 804 may be located in storage devices 806. Storage devices 806 may be in communication with processor unit 804 through communications framework 802. As used herein, a storage device, also referred to as a computer readable storage device, is any piece of hardware capable of storing information on a temporary basis, a permanent basis, or both. This information may include, but is not limited to, data, program code, other information, or some combination thereof.

Memory 814 and persistent storage 816 are examples of storage devices 806. Memory 814 may take the form of, for example, a random access memory or some type of volatile or non-volatile storage device. Persistent storage 816 may comprise any number of components or devices. For example, persistent storage 816 may comprise a hard drive, a flash memory, a rewritable optical disk, a rewritable magnetic tape, or some combination of the above. The media used by persistent storage 816 may or may not be removable.

Communications unit 808 allows data processing system 800 to communicate with other data processing systems, devices, or both. Communications unit 808 may provide communications using physical communications links, wireless communications links, or both.

Input/output unit 810 allows input to be received from and output to be sent to other devices connected to data processing system 800. For example, input/output unit 810 may allow user input to be received through a keyboard, a mouse, some other type of input device, or a combination thereof. As another example, input/output unit 810 may allow output to be sent to a printer connected to data processing system 800.

Display 812 is configured to display information to a user. Display 812 may comprise, for example, without limitation, a monitor, a touch screen, a laser display, a holographic display, a virtual display device, some other type of display device, or a combination thereof.

In this illustrative example, the processes of the different illustrative embodiments may be performed by processor unit 804 using computer-implemented instructions. These instructions may be referred to as program code, computer usable program code, or computer readable program code and may be read and executed by one or more processors in processor unit 804.

In these examples, program code 818 is located in a functional form on computer readable media 820, which is selectively removable, and may be loaded onto or transferred to data processing system 800 for execution by processor unit 804. Program code 818 and computer readable media 820 together form computer program product 822. In this illustrative example, computer readable media 820 may be computer readable storage media 824 or computer readable signal media 826.

Computer readable storage media 824 is a physical or tangible storage device used to store program code 818 rather than a medium that propagates or transmits program code 818. Computer readable storage media 824 may be, for example, without limitation, an optical or magnetic disk or a persistent storage device that is connected to data processing system 800.

Alternatively, program code 818 may be transferred to data processing system 800 using computer readable signal media 826. Computer readable signal media 826 may be, for example, a propagated data signal containing program code 818. This data signal may be an electromagnetic signal, an optical signal, or some other type of signal that can be transmitted over physical communications links, wireless communications links, or both.

The illustration of data processing system 800 in FIG. 8 is not meant to provide architectural limitations to the manner in which the illustrative embodiments may be implemented. The different illustrative embodiments may be implemented in a data processing system that includes components in addition to or in place of those illustrated for data processing system 800. Further, components shown in FIG. 8 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method (600) for generating a visualization of a plurality of service dependencies, the method comprising:
   a network management device (242) monitoring network traffic on a data network;
   the network management device (242) transforming (720) the network traffic into a node indication (420, 430, 440, 450, 460, 470, 520, 530, 540, 550, 560, 570) representative of a plurality of nodes in communication with the data network;
   the network management device (242) transforming (720) the network traffic into a first service path indication representative of a first service path between at least two nodes of the plurality of nodes, and transforming (720) the network traffic into a second service path indication representative of a second service path between at least two other nodes of the plurality of nodes;
   the network management device (242) associating a first color code with the first service path indication and a second color code with the second service path indication, the first and second color codes selected based on a level of dependency between the first and second service paths determined according to a time difference between an interaction distance of the first service path and an interaction distance of the second service path; and
   the network management device (242) transforming (630) the node indication and the first and second service path indications into machine display controls representing a visual representation (400, 500) wherein the first and second service path indications have the first and second color codes, and applying the display controls to a machine display to generate the visual representation;
   wherein the first color code and the second color code are determined according to a distance proportional to the time difference.

2. The method of claim 1,
   wherein the display controls for the first service path indication generate on the machine display a first line having a first color corresponding to the first color code; and
   wherein the display controls for the second service path indication generate on the machine display a second line having a second color corresponding to the second color code assigned to the second service path indication.

3. The method of claim 2, wherein the first color and the second color are different colors that are not variations of one another, representing that the second service path is not dependent on the first service path.

4. The method of claim 2, wherein the second color is a variation of the first color, representing that the second service path is dependent on the first service path.

5. The method of claim 2, wherein the second service path indication is representative of the second service path between a first node and a second node of the plurality of nodes, the second service path corresponding to a first interaction between the first node and the second node.

6. The method of claim 5, wherein the second service path indication is representative of the second service path between the second node and a third node of the plurality of nodes, the second service path corresponding to a second interaction between the second node and the third node.

7. The method of claim 6,
   wherein the display controls for the first service path indication generate on the machine display a first line having a first weight; and
   wherein the display controls for the second service path indication generate on the machine display a second line having a second weight.

8. The method of claim 7,
   wherein the first weight is based on a first Internet Protocol address, a first media access control address (MAC) address, a first port number, a duration of the first interaction, a causality associated with the first interaction, or a transfer entropy value for the first interaction; and
   wherein the second weight is based on a second Internet Protocol address, a second MAC address, a second port number, a duration of the second interaction, a causality associated with the second interaction, or a transfer entropy value for the second interaction.

9. The method of claim 2,
   wherein the first interaction is determined to occur at a first time; and
   wherein the second interaction is determined to occur at a second time; and
   wherein the display controls generate on the machine display an indication of the first time and the second time in association with the first line and the second line, respectively.

10. The method of claim 2, wherein the visual representation comprises a two dimensional representation (400, 500) or a three-dimensional representation.

11. A network data visualization system (300), comprising:
    a graph processing module (304) that receives network data (302) associated with a plurality of nodes in a data network, the graph processing module (304) including:
       a data processing unit (314) that assigns a first color to a first interaction between at least two nodes of the plurality of nodes and assigns a second color to a second interaction between at least two other nodes of the plurality of nodes, the first color and the second color generated from a level of dependency detected from network traffic comprising the first interaction and the second interaction, the level of dependency determined according to a time difference between an interaction instance of a first service path between the at least two nodes and an interaction instance of a second service path of the at least two other nodes;
       a graph layout unit (324) that transforms the first interaction into a first line and transforms the second interaction into a second line; and
       a presentation unit (306) that generates and outputs to a computer display control signals to form a visual representation (400, 500) of at least a portion of the network data, the visual representation (400, 500) including at least computer display controls to represent on the computer display the plurality of nodes (420, 430, 440, 450, 460, 470, 520, 530, 540, 550, 560, 570), the first line in the first color, and the second line in the second color, wherein the first color and the second color are determined according to a distance proportional to the time difference.

12. The network data visualization system (300) of claim 11, wherein the graph layout unit (324) generates the controls for the computer display to form the first line with a first weight based, at least in part, on the first interaction and generates the controls for the computer display to form the second line with a second weight based, at least in part, on the second interaction.

13. The network data visualization system (300) of claim 12,
wherein the first weight is based on a first Internet Protocol address, a first MAC address, a first port number, a duration of the first interaction, a causality associated with the first interaction, or a transfer entropy value for the first interaction; and
wherein the second weight is based on a second Internet Protocol address, a second MAC address, a second port number, a duration of the second interaction, a causality associated with the second interaction, or a transfer entropy value for the second interaction.

14. The network data visualization system (300) of claim 11, wherein
the first interaction occurs at a first time;
wherein the second interaction occurs at a second time; and
wherein the visual representation (400, 500) includes at least computer controls to represent on the computer display an indication of the first time and the second time in association with the first line and second line, respectively.

15. A method (700) of mapping a data network, the method comprising:
receiving (710), by a network management device (242), network data associated with activity on a data network over a time period, the activity including a plurality of interactions among a plurality of nodes in the data network;
analyzing (720), by the network management device (242), the network data to assign a color to each interaction of the plurality of interactions, the color for an interaction representing a dependency or lack of dependency with other interactions having a variation of the color, the dependency or lack of dependency determined according to a time difference between an interaction instance of a first service path between at least two nodes of the plurality of nodes and an interaction instance of a second service path between at least two other nodes of the plurality of nodes, the color determined according to a distance proportional to the time difference;
identifying (730), by the network management device (242), a layout for a visual representation (400, 500) of the data network on a computer display, the layout defining at least a placement of the plurality of nodes and the plurality of interactions; and
generating (740), by the network management device (242), the visual representation (400, 500) on the computer display such that each of the plurality of interactions is depicted as the respective color assigned to each interaction.

16. The method of claim 15, further comprising:
analyzing, by the network management device (242), the network data to assign a weight to each interaction of the plurality of interactions.

17. The method of claim 16, wherein the weight is based on an Internet Protocol address, a MAC address, a port number, a duration of the interaction, a causality associated with the interaction, or a transfer entropy value for the interaction.

* * * * *